US012610325B2

(12) United States Patent
Luo et al.

(10) Patent No.: US 12,610,325 B2
(45) Date of Patent: Apr. 21, 2026

(54) ARRAY SELECTION METHOD, TERMINAL, NETWORK DEVICE, AND STORAGE MEDIUM

(71) Applicant: Datang Mobile Communications Equipment Co., Ltd., Beijing (CN)

(72) Inventors: Yajuan Luo, Beijing (CN); Hui Li, Beijing (CN); Qiubin Gao, Beijing (CN); Runhua Chen, Beijing (CN); Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 424 days.

(21) Appl. No.: 18/250,221

(22) PCT Filed: Oct. 22, 2021

(86) PCT No.: PCT/CN2021/125791
§ 371 (c)(1),
(2) Date: Apr. 24, 2023

(87) PCT Pub. No.: WO2022/083752
PCT Pub. Date: Apr. 28, 2022

(65) Prior Publication Data
US 2024/0007973 A1 Jan. 4, 2024

(30) Foreign Application Priority Data

| Oct. 23, 2020 | (CN) | 202011148642.8 |
| Dec. 10, 2020 | (CN) | 202011458095.3 |
| Dec. 25, 2020 | (CN) | 202011565451.1 |

(51) Int. Cl.
*H04W 52/36* (2009.01)
*H04B 7/06* (2006.01)
(Continued)

(52) U.S. Cl.
CPC ........ *H04W 52/367* (2013.01); *H04B 7/0626* (2013.01); *H04B 17/328* (2023.05); *H04W 16/28* (2013.01)

(58) Field of Classification Search
CPC . H04W 52/367; H04W 16/28; H04W 52/146; H04W 52/42; H04W 8/24;
(Continued)

(56) References Cited

U.S. PATENT DOCUMENTS

| 10,153,731 B2 | 12/2018 | Thyagarajan et al. | |
| 2012/0214528 A1* | 8/2012 | Hashimoto | H04B 7/0413 455/509 |

(Continued)

FOREIGN PATENT DOCUMENTS

| CN | 108539418 A | 9/2018 |
| CN | 109417717 A | 3/2019 |

(Continued)

OTHER PUBLICATIONS

International Search Report received in the corresponding International Application PCT/CN2021/125791, mailed Jan. 5, 2022.
(Continued)

*Primary Examiner* — Joseph E Avellino
*Assistant Examiner* — Anindita Sen
(74) *Attorney, Agent, or Firm* — KILPATRICK TOWNSEND & STOCKTON LLP

(57) ABSTRACT

Provided are an array selection method, a terminal, a network device, and a storage medium. The method includes sending assistance information to a network device, and the assistance information includes at least one of the following: identifier information of an optimal reference signal required for uplink transmission, and an array-based maximum power reduction (P-MPR) value corresponding to one or more arrays of a terminal when a maximum power exposure
(Continued)

(MPE) event occurs; and receiving indication information sent by the network device on the basis of the assistance information, and the indication information is used for indicating an array used by the terminal for subsequent uplink transmission, or for indicating that the terminal performs new uplink beam scanning. The embodiments of the present application avoid the uplink coverage loss caused by an MPE issue.

18 Claims, 3 Drawing Sheets

(51) Int. Cl.
   *H04B 17/318*          (2015.01)
   *H04W 16/28*          (2009.01)
(58) Field of Classification Search
   CPC .. H04W 52/245; H04W 72/21; H04B 7/0626;
               H04B 17/328; H04B 7/06956; H04B
               7/0608; H04B 7/06952; H04L 5/0051;
                                              H04L 5/0048
   See application file for complete search history.

(56)                    References Cited

U.S. PATENT DOCUMENTS

| | | | | |
|---|---|---|---|---|
| 2019/0260454 | A1* | 8/2019 | Lindbom | H04L 5/0023 |
| 2020/0275260 | A1* | 8/2020 | Huang | H04L 5/0051 |
| 2021/0336737 | A1* | 10/2021 | Li | H04L 5/0051 |
| 2021/0391913 | A1* | 12/2021 | Zhou | H04B 7/06956 |

| | | | | |
|---|---|---|---|---|
| 2022/0104036 | A1* | 3/2022 | Zhou | H04W 24/04 |
| 2023/0037661 | A1* | 2/2023 | Cirik | H04B 7/0608 |
| 2023/0292259 | A1* | 9/2023 | Matsumura | H04W 52/18 |

FOREIGN PATENT DOCUMENTS

| | | |
|---|---|---|
| JP | 2022543895 A | 10/2022 |
| WO | 2020192915 A1 | 10/2020 |
| WO | 2020197091 A1 | 10/2020 |
| WO | 2021027863 A1 | 2/2021 |

OTHER PUBLICATIONS

Written Opinion received in the corresponding International Application PCT/CN2021/125791, mailed Jan. 5, 2022.
European Patent Office, Extended European Search Report Issued in Application No. 21882164.3, Mar. 18, 2024, Germany, 10 pages.
Vivo,"Discussion on multi-beam enhancement", 3GPP TSG RAN WG1 #102-e, e-Meeting, Aug. 17-28, 2020, total 21 pages, R1-2005363.
Japanese Patent Office, Office Action Issued in Application No. 2023-524806, Mar. 18, 2024, 5 pages.
Oppo,"Enhancements on Multi-Beam Operation", 3GPP TSG RAN WG1 #102-e, e-Meeting, Aug. 17-28, 2020, total 5 pages, R1-2005983.
NTT Docomo, Inc,"Discussion on multi-beam operation", 3GPP TSG RAN WG1 #102-e, e-Meeting, Aug. 17th-Aug. 28, 2020, total 14 pages, R1-2006951.
Qualcomm Incorporated,"Enhancements on Multi-beam Operation", 3GPP TSG RAN WG1 Meeting #102-e, Aug. 17-28, 2020, total 7 pages, R1-2006790.
Zte,"Enhancements on Multi-beam Operation", 3GPP TSG RAN WG1 Meeting #102-e, e-Meeting, Aug. 17-28, 2020, total 11 pages, R1-2005454.

* cited by examiner

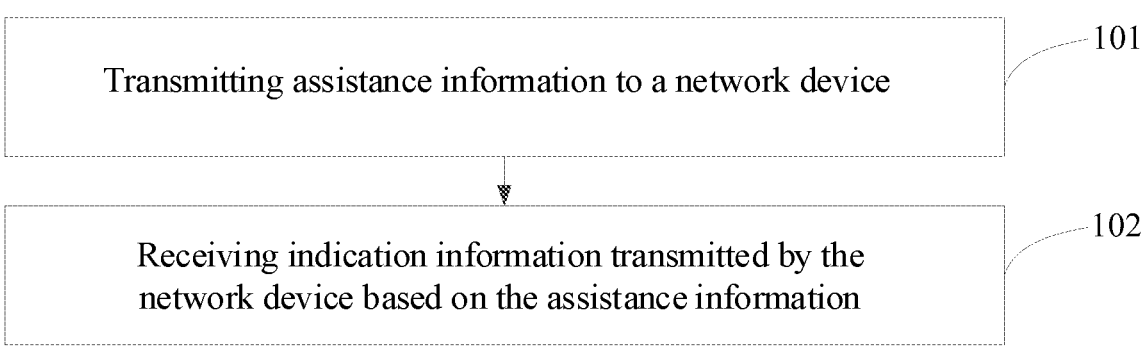

Transmitting assistance information to a network device — 101

Receiving indication information transmitted by the network device based on the assistance information — 102

FIG. 1

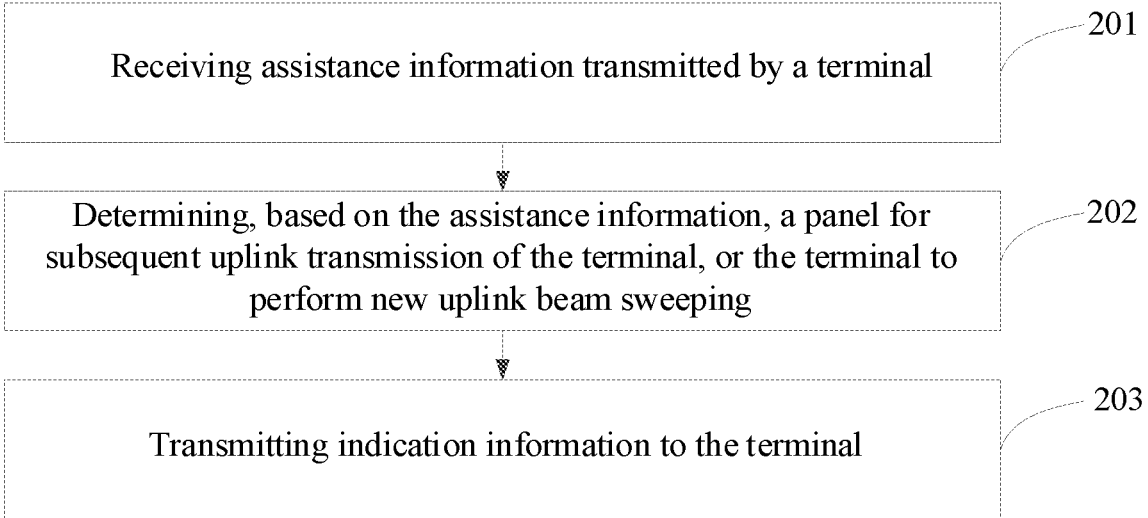

Receiving assistance information transmitted by a terminal — 201

Determining, based on the assistance information, a panel for subsequent uplink transmission of the terminal, or the terminal to perform new uplink beam sweeping — 202

Transmitting indication information to the terminal — 203

FIG. 2

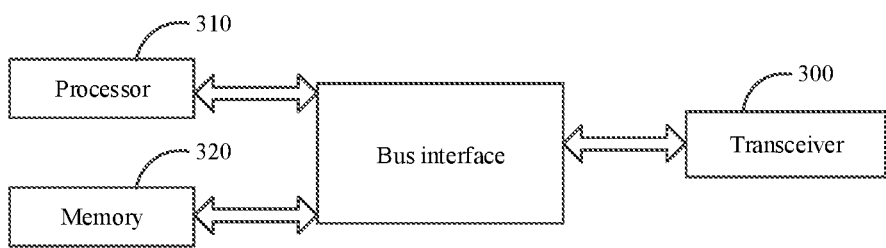

Processor — 310

Memory — 320

Bus interface

Transceiver — 300

| P | R | PH (Type1, PCell) | |
|---|---|---|---|
| MPE or R | | $P_{CMAX,f,c}$ | $P_{new}$ |

FIG. 7

| P | R | PH (Type1, PCell) | |
|---|---|---|---|
| MPE or R | | $P_{CMAX,f,c}$ | CRI/SSBRI |

FIG. 8

ARRAY SELECTION METHOD, TERMINAL, NETWORK DEVICE, AND STORAGE MEDIUM

CROSS-REFERENCE TO RELATED APPLICATIONS

The present application is a National Stage of International Application No. PCT/CN2021/125791, which claims priority to Chinese patent application No. 2020111486428 filed on Oct. 23, 2020, entitled "Array Selection Method, Terminal, Network Device, and Storage Medium", Chinese patent application No. 2020114580953 filed on Dec. 10, 2020, entitled "Array Selection Method, Terminal, Network Device, and Storage Medium", and Chinese patent application No. 2020115654511 filed on Dec. 25, 2020, entitled "Array Selection Method, Terminal, Network Device, and Storage Medium", all of which are hereby incorporated by reference in their entireties.

FIELD

The present application relates to the field of communication technologies, and in particular, to methods for panel selection, a terminal, a network side device, and a storage medium.

BACKGROUND

In case that a traditional terminal with multiple antenna panels performs uplink transmission, power reduction is required, for example, uplink transmission power is reduced to avoid harming a human body if it is detected that the antenna panel is directed at the human body for a period of time. However, power reduction would cause deteriorated uplink coverage. How to avoid or reduce the deteriorated uplink coverage of the multi-panels terminal after the power reduction is a problem that needs to be considered.

SUMMARY

Embodiments of the present application provide methods for panel selection, a terminal, a network side device, and a storage medium, which solve a problem of uplink coverage loss caused by an inability of a network side device to accurately select a panel in case of occurrence of a maximum permissible exposure (MPE) event on a multi-panel terminal.

An embodiment of the present application provides a method for panel selection, including:

transmitting assistance information to a network side device, where the assistance information includes at least one of the following items: identification information of an optimal reference signal required for uplink transmission, or a power management maximum power reduction (P-MPR) value corresponding to one or more panels of a terminal in case of an occurrence of a maximum permissible exposure (MPE) event; and receiving indication information transmitted, based on the assistance information, by the network side device, where the indication information is used to indicate a panel used by the terminal for subsequent uplink transmission, or to indicate the terminal to perform uplink beam sweeping.

An embodiment of the present application provides a method for panel selection, including:

receiving assistance information transmitted by a terminal, where the assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event;

determining, based on the assistance information, a panel used by the terminal for subsequent uplink transmission or the terminal to perform uplink beam sweeping; and transmitting indication information to the terminal, where the indication information is used to indicate the panel used by the terminal for subsequent uplink transmission, or to indicate the terminal to perform uplink beam sweeping.

An embodiment of the present application provides a terminal, including:

a processor;

a memory storing a computer program; and a transceiver transmitting and receiving data under a control of the processor, where the computer program, when executed by the processor, causes the terminal to perform the following operations of:

transmitting assistance information to a network side device, where the assistance information includes at least one of the following items: identification information of an optimal reference signal required for uplink transmission, or a power management maximum power reduction (P-MPR) value corresponding to one or more panels of a terminal in case of an occurrence of a maximum permissible exposure (MPE) event; and receiving indication information transmitted, based on the assistance information, by the network side device, where the indication information is used to indicate a panel used by the terminal for subsequent uplink transmission, or to indicate the terminal to perform uplink beam sweeping.

An embodiment of the present application provides a network side device, including:

a processor;

a memory storing a computer program; and a transceiver transmitting and receiving data under a control of the processor, where the computer program, when executed by the processor, causes the network side device to perform the following operations of:

receiving assistance information transmitted by a terminal, where the assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event;

determining, based on the assistance information, a panel used by the terminal for subsequent uplink transmission or the terminal to perform uplink beam sweeping; and transmitting indication information to the terminal, where the indication information is used to indicate the panel used by the terminal for subsequent uplink transmission, or to indicate the terminal to perform uplink beam sweeping.

An embodiment of the present application provides an apparatus for panel selection, including:

a transmitting device, used to transmit assistance information to a network side device, where the assistance information includes at least one of the following items: identification information of an optimal reference signal required for uplink transmission, or a power management maximum power reduction (P-MPR) value corresponding to one or more panels of a terminal in case of an occurrence of a maximum permissible exposure (MPE) event; and a receiving device, used to receive indication information transmitted, based on the assistance information, by the network side device, where the indication information is used to indicate a panel used by the terminal for subsequent uplink transmission, or to indicate the terminal to perform uplink beam sweeping.

An embodiment of the present application provides an apparatus for panel selection, including:

a receiving device, used to receive assistance information transmitted by a terminal, where the assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event;

a determining device, used to determine, based on the assistance information, a panel used by the terminal for subsequent uplink transmission or the terminal to perform uplink beam sweeping; and a transmitting device, used to transmit indication information to the terminal, where the indication information is used to indicate the panel used by the terminal for subsequent uplink transmission, or to indicate the terminal to perform uplink beam sweeping.

An embodiment of the present application provides a non-transitory computer readable storage medium having stored thereon a computer program that causes, when executed by a processor, the processor to perform any of methods for panel selection described above.

In the methods for panel selection, the terminal, the network side device, and storage medium according to the embodiments of the present application, by transmitting assistance information to the network side device, where the assistance information includes at least one of the following items: identification information of an optimal reference signal required for uplink transmission, or a P-MPR value corresponding to one or more panels of the terminal in case of an occurrence of the MPE event, the performance difference of multiple transmission panels of the terminal may be accurately reflected based on the assistance information, the network side device may accurately indicate the panel used by the terminal for subsequent uplink transmission based on the assistance information, or indicate the terminal to perform uplink beam sweeping, which reduces a loss for uplink coverage caused by the MPE event.

BRIEF DESCRIPTION OF THE DRAWINGS

In order to clearly illustrate solutions according to the present application or the related art, the drawings used in the descriptions of the embodiments or the related art are briefly described below. The drawings in the following description are only some embodiments of the present application.

FIG. 1 is a schematic flowchart showing steps of a method for panel selection applied to a terminal according to an embodiment of the present application;

FIG. 2 is a schematic flowchart showing steps of a method for panel selection applied to a network side device according to an embodiment of the present application;

FIG. 3 is a schematic structural diagram of a terminal according to an embodiment of the present application;

FIG. 7 is a first schematic structural diagram of a media access control-control element (MAE CE) according to an embodiment of the present application; and FIG. 8 is a second schematic structural diagram of an MAE CE according to an embodiment of the present application.

DETAILED DESCRIPTION

Figure 4:
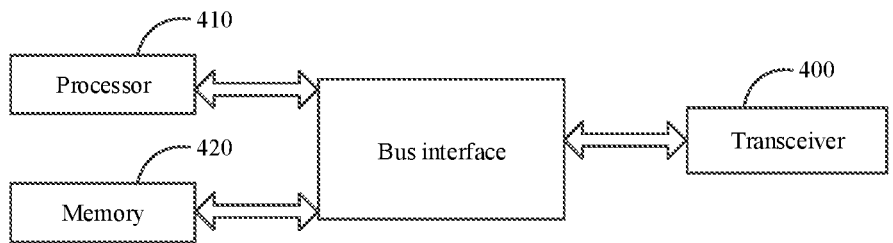
FIG. 4 is a schematic structural diagram of a network side device according to an embodiment of the present application.

The solutions according to the embodiments of the present application are clearly and completely described in the following with reference to the accompanying drawings in the embodiments of the present application. These embodiments are only a part of the embodiments of the present application, and not all of the embodiments.

In new radio (NR) system, in case that a terminal detects an occurrence of a maximum permissible exposure (MPE) event, the terminal determines a maximum permissible power reduction value and performs a corresponding power reduction. In case that the power reduction value is greater than a threshold value ("phr-Tx-PowerFactorChange" dB) within a period of time, the terminal triggers a reporting for power headroom report (PHR), and reports a panel-specific maximum power reduction value and a maximum transmit power value to a base station through a media access control-control element (MAC-CE). The base station receives the MPE report from the terminal and knows that an MPE event occurred on the terminal and the terminal performed power reduction using the power management maximum power reduction (P-MPR) value, where a maximum output power after power reduction is $P_{C\ MAX,f,c}$, and the current power headroom is PH. The base station adjusts resource configuration for signal transmission of the terminal based on these parameters. For example, the base station may estimate, based on these parameters, a duty cycle for uplink transmission performed by the terminal, which makes the terminal meet the exposure limit requirements and do not need to perform power reduction, or the base station may reduce modulation and coding scheme (MCS) for uplink transmission or reduce the number of physical resource blocks transmitted by the terminal. The terminal transmits an uplink signal based on the scheduling of the base station, to achieve an effect of both meeting the MPE requirements and obtaining a good communication quality.

However, in a traditional MPE solution, a situation that the terminal has multiple panels is not considered. In case that the terminal has multiple transmission panels, transmission paths between the multiple transmission panels and the base station are different, and occlusion event of MPE for each transmission panel is independent. The traditional P-MPR reporting scheme may not accurately reflect the performance difference of the multiple transmission panels of the terminal, and in case that the base station receives the report from the terminal, it fails to use the feedback information from the terminal to indicate the terminal to perform a selection within the multiple transmission panels, which may not overcome a loss or reduction for uplink coverage caused by the MPE event.

Embodiments of the present application provide methods for panel selection, a terminal, a network side device, and a storage medium, which solve a problem that feedback information from the terminal can not be used for indicating the terminal to perform a selection within multiple transmission panels.

The methods and the devices or apparatuses are based on the same conception. Since the principles of the methods and the devices or apparatuses to solve the problems are similar, the implementation of the devices or apparatuses and methods may be referred to each other, and the similar part is not repeated.

The solutions according to the embodiments of the present application may be applicable to various systems, for example, 5G systems. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. Each of these various systems includes a terminal side device and a network side device, and may further include a core network part, such as an evolved packet system (EPS), a 5G system (5GS), and the like.

The terminal side device in the embodiments of the present application may be a device that provides voice and/or data connectivity to a user, a handheld device with a wireless connection function, or other processing devices connected to a wireless modem. In different systems, the names of the terminal side device may be different. For example, in the 5G system, the terminal side device may be called as a user equipment (UE). A wireless terminal side device may communicate with one or more core networks (CN) via a radio access network (RAN), and the wireless terminal side device may be a mobile terminal side device, such as a mobile phone (or cellular phone) and a computer with mobile terminal side device, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal side device may be called a system, a subscriber device, a subscriber station, a mobile station, a mobile, a remote station, an access point, a remote terminal, an access terminal, a user terminal, a user agent, and a user device, which are not limited in the embodiments of the present application. Since the terminal side device and other network side devices (such as core network side device, access network side device (i.e. base station)) together form a network that may support communication, the terminal side device may be regarded as a network side device in the present application.

The network side device in the embodiments of the present application may be a base station, and the base station may include multiple cells providing services for the terminal. Depending on the specific scenario, the base station may be called an access point, or may be a device in the access network that communicates with wireless terminal side device through one or more sectors on the air interface, or other names. network side device may be used to exchange received air frames with internet protocol (IP) packets, and act as a router between wireless terminal side device and the rest of the access network, and the rest of the access network may include an IP communication network. The network side device may coordinate attribute management for the air interface. For example, the network side device in the embodiments of the present application may be a base transceiver station (BTS) in a global system for mobile communications (GSM) or a code division multiple access (CDMA), may be a node B in a wide-band code division multiple access (WCDMA), may be an evolutional node B (eNB or e-Node B) in a long term evolution (LTE) system, may be a 5G base station (gNB) in 5G network architecture (next generation system), may be a home evolved node B (HeNB), a relay node, a femto, a pico base station (pico), etc., which are not limited in the embodiments of the present application. In some network structures, a network side device may include a centralized unit (CU) node and a distributed unit (DU) node, and the centralized unit and the distributed unit may be geographically separated.

It should be noted that "one embodiment" or "an embodiment" throughout the specification means that a particular feature, structure, or characteristic associated with the embodiment is included in one or more embodiments of the present application. Thus, "in one embodiment" or "in an embodiment" throughout this specification does not necessarily refer to the same embodiment, and the particular features, structures or characteristics may be combined in any suitable manner in one or more embodiments.

The present application is described below in detail.

FIG. 1 is a schematic flowchart showing steps of a method for panel selection applied to a terminal according to an embodiment of the present application. The method includes the following steps.

Step 101: transmitting assistance information to a network side device.

In the present embodiment, the terminal has two or more panels. The terminal transmits the assistance information to the network side device for the network side device determines a panel used by the terminal for subsequent uplink transmission, or determines the terminal to perform uplink beam sweeping. For example, the terminal transmits the assistance information to the network side device, and then the network side device may determine, based on the assistance information, the panel used by the terminal for subsequent uplink transmission, or determine the terminal to perform uplink beam sweeping.

The assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event. For example, the terminal may transmit the identification information of the optimal reference signal required for uplink transmission as the assistance information to the network side device, and/or transmit the P-MPR value corresponding to one or more panels of the terminal as the assistance information to the network side device.

For example, the identification information of the optimal reference signal required for uplink transmission may be a channel state information reference signal resource indicator (CRI) or a synchronization signal block resource indicator (SSBRI).

The optimal reference signal required for uplink transmission may be a reference signal with the highest uplink transmission power value, which enables the network side device to specify the panel with the optimal performance based on the optimal reference signal, and then select the beam or panel corresponding to the optimal reference signal required for uplink transmission as the beam or panel for uplink transmission, which reduces a loss for uplink coverage caused by the MPE event.

In case that an MPE event occurs, the terminal may transmit a P-MPR value corresponding to one panel or P-MPR values corresponding to respective panels of the multiple panels to the network side device.

The multiple panels may be all panels of the terminal. In case that the assistance information includes a P-MPR value corresponding to a panel, the P-MPR value may be the P-MPR value corresponding to the panel where the MPE event occurred, and then the network side device may directly select other panels or beams for subsequent uplink transmission based on this P-MPR value.

Based on that each panel corresponds to a P-MPR value, the P-MPR reporting may accurately reflect the performance difference of multiple panels of the terminal, and the network side device may know the P-MPR value corresponding to each panel, and then the network side device may select the panel for transmission based on the P-MPR value and use a panel or beam having the highest beam intensity as the panel or beam used for subsequent uplink transmission, which reduces uplink coverage loss or reduction caused by the MPE event.

For example, the uplink transmission may include a physical uplink control channel (PUCCH), a physical uplink shared channel (PUSCH) or a channel sounding reference signal (SRS).

Step 102: receiving indication information transmitted by the network side device based on the assistance information.

The indication information is used to indicate a panel used by the terminal for subsequent uplink transmission, or to indicate the terminal to perform uplink beam sweeping.

After receiving the assistance information from the terminal, the network side device may determine, based on the assistance information, the panel or beam used by the terminal for subsequent uplink transmission or determine the terminal to perform uplink beam sweeping, and transmit indication information to the terminal.

In an embodiment, the terminal may be indicated through an uplink (UL) transmission configuration indicator (TCI) architecture.

Based on the assistance information, the performance difference of multiple transmission panels of the terminal may be accurately reflected, which ensures the high quality of the determined panel or beam used by the terminal for subsequent uplink transmission, and reduces a loss for uplink coverage caused by the MPE event.

In the embodiments of the present application, by transmitting assistance information to the network side device, where the assistance information includes at least one of the following items: identification information of an optimal reference signal required for uplink transmission, or a P-MPR value corresponding to one or more panels of the terminal in case of the occurrence of the MPE event, the performance difference of multiple transmission panels of the terminal may be accurately reflected based on the assistance information, the network side device may accurately indicate the beam or panel used by the terminal for subsequent uplink transmission based on the assistance information, or indicate the terminal to perform uplink beam sweeping, which reduces the loss for uplink coverage caused by the MPE event.

In the present embodiment, in case that the assistance information includes a P-MPR value corresponding to one or more panels of the terminal, the assistance information may further include an MPE event or reference signal received power (RSRP) corresponding to one or more panels.

For example, in case that the terminal reports the P-MPR value corresponding to one or more panels to the network side device, it may also report the MPE event or the RSRP corresponding to one or more panels, or report both the MPE event and the RSRP corresponding to one or more panels, and then the network side device may select the beam or panel used for subsequent uplink transmission based on the above information.

In an embodiment, a triggering condition for the MPE event may include that a P-MPR value is greater than a preset reduction value within a preset period, or an estimated value of the RSRP corresponding to an uplink beam for any panel is smaller than a preset value.

For example, in case that the P-MPR value is greater than the preset reduction value within the preset period, or the estimated value of the RSRP corresponding to the uplink beam for any panel is smaller than the preset value, it may be determined that an MPE event has occurred.

In the present embodiment, the network side device may control the terminal to report the assistance information, or the terminal may report the assistance information autonomously. The two methods are described below respectively.

In an embodiment, the assistance information may be transmitted to the network side device by any of the following modes.

In mode 1, notification information transmitted by the network side device is received, and assistance information is transmitted to the network side device according to the notification information.

In an embodiment, the notification information is used to notify the terminal to report the identification information of the optimal reference signal required for uplink transmission. In this case, the assistance information includes the identification information of the optimal reference signal required for uplink transmission.

In this mode, the network side device may configure a reference signal resource for the terminal through higher layer signaling, and configure the notification information through the higher layer signaling or L1 dynamic signaling to indicate the terminal to measure and report the identification information (CRI/SSBRI) of the optimal reference signal for uplink transmission, where the higher layer signaling includes L2 signaling or L3 signaling.

For example, the notification information configured by the higher layer signaling may be as follows:

```
CSI-ReportConfig ::=          SEQUENCE {
    reportQuantity              CHOICE {
```

-continued

| CRI | NULL, |
|---|---|
| SSBRI | NULL |
| }. | |

In one embodiment, the notification information is used to notify the terminal to report the P-MPR value corresponding to one or more panels of the terminal. In this case, the assistance information includes the P-MPR value corresponding to one or more panels of the terminal.

In one embodiment, the notification information is used to notify the terminal to report the identification information of the optimal reference signal required for uplink transmission and the P-MPR value corresponding to one or more panels of the terminal. In this case, the assistance information includes the identification information of the optimal reference signal required for uplink transmission and the P-MPR value corresponding to one or more panels of the terminal.

In the above mode, the terminal is triggered by the network side device to transmit the assistance information, and the network side device notifies the terminal to transmit the assistance information only if the assistance information is required, which avoids the invalid transmission of the assistance information by the terminal.

In an embodiment, the notification information is further used to notify the terminal to report RSRP after power reduction. In this case, the assistance information further includes the RSRP after power reduction. The RSRP may be L1-RSRP, and then the network side device may determine the optimal beam based on an assistance of the RSRP reported by the terminal after the MPE event occurs.

In addition, before receiving the notification information transmitted by the network side device, the terminal may report capability information to the network side device, where the capability information is used to indicate that the terminal has a capability of considering a power reduction value in calculating the optimal reference signal.

For example, for the case that the network side device controls the reporting of the assistance information, the multiple-panel terminal is required to report the capability to notify the network side device that the terminal has a capability of considering a power reduction value in calculating the optimal reference signal, which shows that the optimal reference signal reported by the terminal has reflected the influence of power reduction, and ensures the reliability of the optimal reference signal in case of the MPE event.

In addition, before transmitting the assistance information to the network side device based on the notification information, the terminal is required to perform RSRP measurement on the reference signal configured by the network side device using each panel to obtain RSRP of the reference signal measured on each panel; and then the terminal determines a reference signal having the highest uplink transmission power value based on the RSRP of the reference signal measured in each panel and the P-MPR value corresponding to each panel, and determines the reference signal having the highest uplink transmission power value as the optimal reference signal required for uplink transmission.

For example, after receiving the notification message, the terminal measures the quality of the downlink reception signal based on the configuration by the network side device, and determines the optimal reference signal required for uplink transmission based on measurement result and the power reduction in case of occurrence of the MPE event, and finally report the identification information (i.e., CRI/ SSBRI) of the optimal reference signal to the network side device to assist the network side device in selecting the panel or beam for subsequent uplink transmission. The network side device may regard the panel or beam corresponding to the optimal reference signal as a panel or beam required for subsequent uplink transmission, which reduce a loss for uplink coverage caused by the MPE event.

For example, assuming that the terminal has two panels, namely a first panel and a second panel, the terminal performs capability reporting and informs the network side device that the terminal considers power reduction in the calculation for the optimal reference signal. In addition, the network side device configures two channel state information reference signal (CSI-RS) resources for the terminal, namely a first CSI-RS resource and a second CSI-RS resource, and configures the terminal to measure the first CSI-RS through the first panel and measure the second CSI-RS resource through the second panel. The configuration information is:

| CSI-ReportConfig ::= | SEQUENCE { |
|---|---|
| reportQuantity | CHOICE { |
| CRI | NULL, |
| SSBRI | NULL |
| } | |

The terminal performs measurement based on the configuration from the network side device, and obtains a measurement value, namely, a first RSRP, on the first panel and a measurement value, namely, a second RSRP, on the second panel. The terminal estimates uplink transmission power values for the first panel and the second panel based on the first RSRP value and the second RSRP value. Assuming that the terminal detects that there is human obscure in the direction of the first panel, the power reduction value is determined to be the first P-MPR. Similarly, the terminal may determine the power reduction value to be the second P-MPR in the direction of the second panel. If there is no obscure, the power reduction value is 0. The terminal then compares a difference between the first RSRP and the first P-MPR with a difference between the second RSRP and the second P-MPR. In case that the difference between the first RSRP and the first P-MPR is less than the difference between the second RSRP and the second P-MPR, the terminal determines that a beam intensity for the uplink signal transmitted using the second panel is greater than a beam intensity for the uplink signal transmitted using the first panel, and the terminal reports the second CSI-RS resource corresponding to the second panel to the network side device, which indicates that transmission performance is best in case that the terminal use the corresponding beam or panel for uplink transmission.

Then, after receiving the indication from the terminal, the network side device indicates the terminal to transmit the PUSCH in subsequent uplink PUSCH transmission using the reception beam or panel including the second CSI-RS through a UL TCI state. After receiving the indication from the network side device, the terminal transmits the PUSCH using the beam corresponding to the panel.

In mode 2, the terminal transmits the assistance information to the network side device in case that it detects the occurrence of the MPE event.

The assistance information may include at least one of the following items: identification information of an optimal reference signal required for uplink transmission, a P-MPR value corresponding to one or more panels of the terminal.

In this mode, in case that the terminal detects the occurrence of an MPE event, the terminal may determine the P-MPR value corresponding to one or more panels and/or the identification information of the optimal reference signal required for uplink transmission, and notifies, in a resource configured by the network side device, the network side device of the P-MPR value corresponding to the one or more panels and/or the identification information of the optimal reference signal required for uplink transmission. The network side device may determine and select the panel used by the terminal for subsequent uplink transmission based on the P-MPR value corresponding to the one or more panel and/or the identification information of the optimal reference signal required for uplink transmission and indicates it to the terminal.

For example, assuming that the terminal has 2 panels, denoted as panel-ID0 and panel-ID1. The network side device configures a PUCCH resource for transmitting the MPE event for the terminal through a radio resource control (RRC) signaling. The network side device also configures a slot m and a timing offset for transmitting the PUCCH for the terminal. In the n-th slot, the terminal detects that the P-MPR value on panel-ID0 exceeds the threshold value predefined by the system, that is, an MPE event occurs, and then the terminal transmits the MPE event and P-MPR0 on panel-ID0 over the PUCCH resource configured by the system. The indication of transmitting a panel may be an explicit panel-ID indication, or an implicit indication through an uplink/downlink reference signal.

After receiving and demodulating the PUCCH, the network side device knows that an MPE event occurs on the panel-ID0 of the terminal. The network side device indicates the terminal to transmit uplink data using panel-ID1 in subsequent uplink data transmission. In the subsequent uplink data transmission procedure, the terminal transmits the uplink signal using the panel-ID1 indicated by the network side device. If the terminal does not receive the indication from the network side device, the terminal continues to use panel-ID0 to perform uplink data transmission by default.

For another example, assuming that the terminal has 2 panels, denoted as panel-ID0 and panel-ID1. The network side device indicates the terminal to report the P-MPR value through a MAC CE signaling. The network side device indicates PUSCH resource for transmitting the P-MPR value for the terminal through L1 dynamic signaling. In the n-th slot, the terminal detects that any of P-MPR value on panel-ID0 or P-MPR value for panel-ID1 exceeds the threshold value predefined by the system, and then the terminal transmits P-MPR0 on panel-ID0 and P-MPR1 on the panel-ID1 over the PUSCH resource configured by the system. The indication of transmitting the panel may be an explicit panel-ID indication, or an implicit indication through an uplink/downlink reference signal.

After the network side device receives and demodulates the PUSCH, if the value of P-MPR0 is greater than that of P-MPR1, it means that the power reduction of transmitting signal by panel-ID1 is small. Assuming that the maximum transmit powers of the two panels are the same, the network side device determines that a beam strength of transmitting the uplink signal using the panel-ID1 is greater than a beam strength of transmitting the uplink signal using the panel-ID0. Then, after receiving the indication from the terminal, the network side device indicates the terminal to transmit the uplink signal using the panel-ID1 in subsequent uplink PUSCH/PUCCH transmission through the UL TCI state.

In the present embodiment, request information may also be transmitted to the network side device while the assistance information is transmitted to the network side device, where the request information is used to trigger the network side device to transmit one or more channel state information reference signals (CSI-RSs) to perform beam sweeping, the one or more CSI-RSs are pre-associated with the panel of the terminal, and one panel of the terminal is associated with one or more of the CSI-RSs. The terminal then measures the reference signal received power (RSRP) after power reduction corresponding to each CSI-RS and determines, based on the measurement results, a reference signal with the highest transmit power value after power reduction to be the optimal reference signal required for uplink transmission.

In one embodiment, the terminal measures each CSI-RS, obtains a reference signal received power (RSRP) corresponding to the panel associated with the corresponding CSI-RS, estimates, based on the RSRP, the uplink transmission power corresponding to the panel associated with the corresponding CSI-RS, determines a uplink transmission power after power reduction of the panel associated with the corresponding CSI-RS based on a power reduction value corresponding to the panel associated with the corresponding CSI-RS, and determines a reference signal associated with a panel having the highest uplink transmission power after power reduction to be the optimal reference signal required for uplink transmission.

For example, assuming that the terminal has two panels, namely a first panel panel0 and a second panel panel1, the terminal performs capability reporting and informs the network side device that the terminal considers power reduction in the calculation for the optimal reference signal. In addition, the network side device configures two channel state information reference signal (CSI-RS) resources for the terminal, namely a first CSI-RS resource and a second CSI-RS resource, and configures the terminal to measure the first CSI-RS through the first panel and measure the second CSI-RS resource through the second panel.

The terminal performs measurement based on the configuration from the network side device, and obtains a measurement value L1-RSRP0 for the first panel panel0 and a measurement value L1-RSRP1 for the second panel panel1. The terminal estimates uplink transmission power values P0 and P1 of panel0 and panel1 based on L1-RSRP0 and L1-RSRP1. Assuming that the terminal detects that there is human obscure in the direction of panel0, the power reduction value is determined to be p_mpr0. Similarly, the terminal determines the power reduction value in the direction of panel1 to be p_mpr1. If there is no obscure, the power reduction value is 0. The terminal compares a difference between P0 and p_mpr0 with a difference between P1 and p_mpr1. If the difference between P0 and p_mpr0 is less than the difference between P1 and p_mpr1, the terminal determines that a beam intensity for the uplink signal transmitted using the panel 1 is greater than a beam intensity for the uplink signal transmitted using the panel 0, and the terminal reports the first CSI-RS resource1 to the network side device and indicates that transmission performance is best in case that the terminal use the corresponding beam or panel for uplink transmission. After receiving the indication from the terminal, the network side device indicates the terminal to transmit the PUSCH using the reception beam/panel including the reference signal CSI-RS1 in subsequent uplink PUSCH transmission through the UL TCI state. After receiving the indication from the network side device, the terminal transmits the PUSCH using the beam corresponding to the panel.

As shown in FIG. 7, a first preset field is added to the MAC CE, and the first preset field includes the request information; the transmitting the request information to the network side device includes:

transmitting, by the terminal, the request information to the network side device through the MAC CE.

In case that a terminal with multiple transmission panels detects the occurrence of an MPE event based on a pre-defined threshold, the terminal determines a panel or beam based P-MPR value and notifies the network side device of the panel or beam based power reduction value as well as maximum output power $P_{C\,MAX}$ for the power reduction and power headroom (PH) over the uplink transmission resources configured by the network side device. As shown in FIG. 7, the terminal triggers the network side device to transmit one or more CSI-RSs by using the first preset field ($P_{new}$ field) having bit width of 1 bit; the network side device receives the report from the terminal and transmits one or more CSI-RSs for beam sweeping. The terminal measures the L1-RSRP value of the CSI-RS and considers the P-MPR value for the beam corresponding to the power, selects the optimal reference signal and reports the CSI-RS resource indicator (CRI) to the network side device, and assists the network side device in selecting a panel or a beam used for subsequent uplink transmission (PUCCH/PUSCH/SRS) and indicates the selected panel or beam to the terminal.

For example, assuming that the terminal has 2 panels, including panel-ID1 and panel-ID2. Panel-ID1 is associated with CSI-RS1 and CSI-RS2, and Panel-ID2 is associated with CSI-RS3 and CSI-RS4. The association relationship may be pre-established by beam sweeping. In the n-th slot, assuming that the terminal is scheduled to perform uplink PUSCH transmission, and the terminal transmits the PUSCH using the beam receiving the CSI-RS1. The terminal detects that an MPE event occurs on panel-ID1 and performs a power reduction. The power reduction value is P_MPR1 and exceeds the threshold configured by the system. The terminal transmits an MPE report to the network side device using the PHR MAC-CE shown in FIG. 7. The $P_{new}$ field having a bit width of 1 bit is used to trigger the network side device to transmit CSI-RS.

After receiving the report from the terminal, the network side device transmits CSI-RS1, CSI-RS2, CSI-RS3 and CSI-RS4 for beam sweeping, and the terminal measures each CSI-RS and compares the L1-RSRP value for each CSI-RS and considers the influence of power reduction. For example, the terminal compares L1-RSRP$_{1,1}$-P_MPR1, L1-RSRP$_{1,2}$-P_MPR2, L1-RSRP$_{2,3}$-P_MPR2, L1-RSRP$_{2,4}$-P_MPR4, where L1-RSRP$_{i,j}$ represents L1-RSRP value of the j-th CSI-RS on panel-ID i. In case that L1-RSRP$_{2,4}$-P_MPR4 is the largest, the terminal determines that the beam used for receiving the fourth CSI-RS on panel-ID2 is the optimal beam for uplink transmission. The terminal reports the CRI-RS4 to the network side device, and the network side device receives the report from the terminal and indicates the terminal to transmit the PUSCH using the beam for receiving the fourth CSI-RS on panel-ID2.

In some embodiments, a second preset field is added to a MAC CE, and the second preset field is used to indicate the identification information of the optimal reference signal required for uplink transmission. The terminal transmits the assistance information to the network side device through the MAC CE, where the assistance information includes the identification information of the optimal reference signal required for uplink transmission and the P-MPR value corresponding to one or more panels of the terminal.

The MAC CE with a second preset field is shown in FIG. 8, where the CRI/SSBRI field in the MAC CE is a second preset field. In this case, the optimal reference signal required for uplink transmission may be determined by providing values of CRI/SSBRI based on corresponding relationship between the values of CRI/SSBRI and the panels or beams.

In case that a terminal with multiple transmission panels detects the occurrence of an MPE event based on a pre-defined threshold, the terminal determines a panel or beam based P-MPR value and notifies the network side device of the panel or beam based power reduction value, maximum output power $P_{C\,MAX}$ for the power reduction, power head-room (PH) and optimal reference signal (CRI/SSBRI) for uplink transmission over the uplink transmission resources configured by the network side device as shown in FIG. 8 to assist the network side device in selecting the panel/beam used by the terminal for subsequent uplink transmission (PUCCH/PUSCH/SRS) and indicate to the terminal. The optimal reference signal required for uplink transmission may be a candidate beam without the MPE event.

For example, for the mode in which the terminal autono-mously reports assistance information after the MPE event occurs.

Assuming that the terminal has 2 panels, denoted as panel-ID0 and panel-ID1. In the n-th slot, the terminal detects that an MPE value for transmit beam on panel-ID0 exceeds a threshold, and the terminal performs power reduc-tion for the beam on panel-ID0. Assuming that the power reduction value P-MPR is 6 dB, which exceeds the threshold (for example, 3 dB) pre-specified by the network, the terminal triggers the MPE report, and transmits the MAC CE shown in FIG. 8 to the network side device over the uplink transmission resources allocated by the network side device. In the MAC CE shown in FIG. 8, the MPE field is set to 01 (2 bits), indicating that the absolute value of the actually used P-MPR is 6 dB. The value of the CRI/SSBRI field is 1, indicating that the beam 1 on panel-ID1 is used as a candidate beam without power reduction for subsequent uplink transmission. After receiving the indication from the terminal, the network side device indicates the terminal to transmit the PUSCH in subsequent uplink PUSCH trans-mission using the reception beam/panel for CSI-RS1 through the UL TCI state. After receiving the indication from the network side device, the terminal transmits the PUSCH using the beam corresponding to the panel-ID1.

For another example, assuming that the terminal has 2 panels, denoted as panel-ID1 and panel-ID2. Panel-ID1 is associated with CSI-RS1 and CSI-RS2, Panel-ID2 is asso-ciated with CSI-RS3 and CSI-RS4, and this association may be pre-established by beam sweeping. In the n-th slot, assuming that the terminal is scheduled to perform uplink PUSCH transmission, and transmit the PUSCH using the beam for receiving the CSI-RS1. The terminal detects that an MPE event occurs on panel-ID1 and performs a power reduction, where the power reduction value is P_MPR1 and exceeds the threshold configured by the system. The termi-nal transmits an MPE report to the network side device using the PHR MAC-CE shown in FIG. 8. After receiving the report from the terminal, the network side device transmits CSI-RS1, CSI-RS2, CSI-RS3, and CSI-RS4 for beam sweeping. The terminal measures and compares L1-RSRP values for respective CSI-RSs and considers the influence of power reduction. For example, the terminal compares L1-RSRP$_{1,1}$-P_MPR1, L1-RSRP$_{1,2}$-P_MPR2, L1-RSRP$_{2,3}$-

P_MPR2, $L1\text{-}RSRP_{2,4}\text{-}P\_MPR4$, where $L1\text{-}RSRP_{i,j}$ represents L1-RSRP value of the j-th CSI-RS on panel-ID i. In case that $L1\text{-}RSRP_{1,1}\text{-}P\_MPR1$, $L1\text{-}RSRP_{1,2}\text{-}P\_MPR2$ are the largest and the second largest, which are denoted as $L1\text{-}RSRP_{new,1}$ and $L1\text{-}RSRP_{new,2}$ respectively, the terminal reports $L1\text{-}RSRP_{new,1}+CRI1$, $L1\text{-}RSRP_{new,2}+CRI2$ to the network side device. The network side device receives the report from the terminal, selects a beam, such as the beam for receiving CSI-RS1, as the optimal beam for uplink transmission, and indicates the terminal to transmit the PUSCH using the beam for receiving the first CSI-RS on panel-ID1.

Through the above modes, it may be achieved that the terminal transmits the assistance information autonomously, the terminal may report the assistance information immediately after the MPE event occurs, and the network side device may timely select the panel or beam used by the terminal for subsequent uplink transmission, which reduces a loss for uplink coverage caused by the MPE event.

The assistance information may be transmitted in any of the above-mentioned modes.

In the present embodiment, the transmitting the assistance information to the network side device may include any of the followings:

transmitting the assistance information to the network side device periodically;

transmitting the assistance information to the network side device semi-persistently; and transmitting the assistance information to the network side device aperiodically.

For example, the terminal may transmit the assistance information periodically, semi-persistently or aperiodically to ensure the flexibility of the modes of transmitting the assistance information.

It should be noted that in case that the terminal transmits the assistance information to the network side device, the assistance information may be transmitted to the network side device through a physical random access channel (PRACH), PUCCH or PUSCH, which is not limited here.

In the method for panel selection based on the embodiments of the present application, by transmitting assistance information to the network side device, where the assistance information includes at least one of the following items: identification information of an optimal reference signal required for uplink transmission, or a P-MPR value corresponding to one or more panels of the terminal in case of the occurrence of the MPE event, the performance difference of multiple transmission panels of the terminal may be accurately reflected based on the assistance information, the network side device may accurately select the panel used by the terminal for subsequent uplink transmission based on the assistance information, which reduces a loss for uplink coverage caused by the MPE event.

FIG. 2 is a schematic flowchart showing steps of a method for panel selection applied to a network side device according to an embodiment of the present application. The method includes the following steps.

Step 201: receiving assistance information transmitted by a terminal.

The assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event.

In an embodiment, the network side device receives the assistance information transmitted by the terminal and the assistance information may include at least one of the following items: identification information of the optimal reference signal required for uplink transmission, or the P-MPR value corresponding to one or more panels of the terminal in case of the occurrence of the MPE event.

For the description of the assistance information, reference may be made to the related description of the terminal side, which is not repeated here.

Step 202: determining, based on the assistance information, a panel used by the terminal for subsequent uplink transmission, or the terminal to perform uplink beam sweeping.

In this step, after obtaining the assistance information, the network side device, based on the assistance information, may determine the terminal to perform uplink beam sweeping, for example, control the terminal to perform the uplink beam sweeping to select a panel or beam, or determine the panel used by the terminal for subsequent uplink transmission to achieve a selection for the optimal panel or beam, to reduce the loss for uplink coverage caused by the MPE event.

Step 203: transmitting indication information to the terminal.

The indication information is used to indicate the panel used by the terminal for subsequent uplink transmission, or to indicate the terminal to perform uplink beam sweeping.

In this step, after determining the terminal to perform the uplink beam sweeping or determining the beam or panel used by the terminal for subsequent uplink transmission, the network side device transmits indication information to the terminal to indicate the beam or panel used by the terminal for subsequent uplink transmission, or indicate the terminal to perform the uplink beam sweeping.

In the embodiment, by receiving assistance information transmitted by the terminal, where the assistance information includes at least one of the following items: identification information of the optimal reference signal required for uplink transmission, or the P-MPR value corresponding to one or more panels of the terminal in case of the occurrence of the MPE event, the performance difference of multiple transmission panels of the terminal may be accurately reflected based on the assistance information, the network side device may accurately indicate the beam or panel used by the terminal for subsequent uplink transmission based on the assistance information, or indicate the terminal to perform uplink beam sweeping, which reduces the loss for uplink coverage caused by the MPE event.

In the present embodiment, the network side device may determine the beam or panel used by the terminal for subsequent uplink transmission based on the assistance information using any one of the following modes.

In mode 1, in case that the assistance information includes the identification information of the optimal reference signal required for uplink transmission, the panel or beam corresponding to the optimal reference signal required for uplink transmission is determined as the panel or beam used by the terminal for subsequent uplink transmission. beam.

For example, in case that the assistance information includes the identification information of the optimal reference signal required for uplink transmission, the network side device may directly determine the panel or beam corresponding to the optimal reference signal as the panel or the beam used by the terminal for subsequent uplink transmission, Thus, it is ensured that a beam intensity of the determined panel or beam used by the terminal for subsequent uplink transmission is the highest beam intensity, and the loss for uplink coverage caused by the MPE event is avoided.

In mode 2, in case that the assistance information includes the P-MPR value corresponding to one or more panels of the terminal, a panel or beam having the highest uplink transmission power value is determined based on the P-MPR value corresponding to one or more panels of the terminal, and the panel or beam having the highest uplink transmission power value is determined as the panel or beam used by the terminal for subsequent uplink transmission.

In an embodiment, in case that the assistance information includes the P-MPR value corresponding to one or more panels of the terminal, the network side device determines, among all panels or beams of the terminal, a panel or beam having the highest uplink transmission power value based on the P-MPR value corresponding to one or more panels of the terminal, for example, a panel or beam having the highest beam intensity is selected, and then the panel or beam having the highest uplink transmission power value is determined as the panel or beam used by the terminal for subsequent uplink transmission.

In case that the assistance information further includes RSRP corresponding to the one or more panels, the network side device may further refer to the RSRP corresponding to the one or more panels to determine the panel or beam having the highest uplink transmission power value. The network side device may calculate a difference between the RSRP and P-MPR value corresponding to each panel, and determine the panel or beam with the largest difference as the panel or beam having the highest uplink transmission power value.

In case that RSRPs corresponding to all the panels are the same, the network side device does not receive RSRP corresponding to one or more panels, but may determine a panel or beam having the highest uplink transmission power value. In this case, the network side device may determine a panel or beam with smallest P-MPR value as the panel or beam having the highest uplink transmission power value.

By any of the above modes, the panel or beam used by the terminal for subsequent uplink transmission may be accurately determined and the loss for uplink coverage caused by the MPE event is avoided.

In the present embodiment, in case that the assistance information includes the P-MPR value corresponding to one or more panels of the terminal, the assistance information furthers include MPE event and/or reference signal received power (RSRP) corresponding to one or more panels.

In an embodiment, a triggering condition for the MPE event includes that the P-MPR value is greater than a preset reduction value within a preset period, or an estimated value of the RSRP corresponding to an uplink beam for any panel is smaller than a preset value.

In an embodiment, the uplink transmission includes PUCCH, PUSCH or SRS.

For the description of the above information, reference may be made to the related description of the terminal side, which is not repeated here.

In an embodiment, the network side device receives the assistance information transmitted by the terminal by any of the following modes.

In mode 1, the network side device transmits notification information the terminal, and receives the assistance information transmitted by the terminal based on the notification information.

The notification information is used for notifying the terminal to report at least one of the following items:

identification information of an optimal reference signal required for uplink transmission, or a P-MPR value corresponding to one or more panels of the terminal.

The notification information is further used to notify the terminal to report RSRP after power reduction. In this case, the assistance information further includes RSRP after power reduction.

Before transmitting the notification information to the terminal, the network side device may receive capability information transmitted by the terminal, where the capability information is used to indicate a terminal capability of considering a power reduction value in calculating the optimal reference signal.

In mode 2, the network side device receives the assistance information transmitted by the terminal in case that occurrence of the MPE event is detected.

The assistance information includes at least one of the following items: identification information of an optimal reference signal required for uplink transmission, or the P-MPR value corresponding to one or more panels of the terminal.

Besides assistance information transmitted by the terminal in case that the terminal detects the occurrence of the MPE event, the network side device further receives request information transmitted by the terminal, where the request information is used to trigger the network side device to transmit one or more channel state information reference signals (CSI-RSs) to perform beam sweeping, where one or more CSI-RSs are pre-associated with the panel of the terminal, and one panel of the terminal is associated with one or more of the CSI-RSs. The network side device transmits one or more CSI-RSs for beam sweeping based on the request information and the terminal then measures and compares the RSRP value after power reduction corresponding to each CSI-RS, determines a reference signal with the highest transmission power value to be an optimal reference signal required for uplink transmission based on measurement results, transmits the optimal reference signal required for uplink transmission to the network side device. The network side device may determine the panel or beam for uplink transmission based on the relationship between one or more CSI-RSs and the panel of the terminal.

In an embodiment, a first preset field is added to the MAC CE, and the first preset field includes the request information; the terminal transmits the request information to the network side device through the MAC CE.

In an embodiment, a second preset field is added to the MAC CE, and the second preset field is used to indicate the identification information of the optimal reference signal required for uplink transmission. The network side device receives the assistance information transmitted by the terminal through the MAC CE.

The network side device may control the terminal to transmit assistance information or the terminal may autonomously transmit assistance information in case that an MPE event is triggered. For the specific content of the above two methods, please refer to the relevant content of the method embodiment on the terminal side, which is not repeated here.

In an embodiment, the network side device receives the assistance information transmitted by the terminal by any of the following items:

receiving assistance information periodically transmitted by the terminal;

receiving assistance information semi-persistently transmitted by the terminal; and receiving assistance information aperiodically transmitted by the terminal.

In case that the network side device receives the assistance information transmitted by the terminal, it may receive the assistance information transmitted by the terminal through PRACH, PUCCH or PUSCH.

For the specific description of specific receiving modes of the above-mentioned assistance information, reference may be made to the method embodiment on the terminal side, which is not repeated here.

In the method for panel selection according to the present embodiment, the network side device receives assistance information and selects a panel or beam used by the terminal for subsequent uplink transmission based on the assistance information, or determines that the terminal performs uplink beam sweeping, and the property of the panel of the terminal may be reflected based on the assistance information. The loss for uplink coverage caused by the MPE event may be avoided after the terminal uses the panel or beam selected by the network side device or performs the uplink beam sweeping.

FIG. 3 is a schematic structural diagram of a terminal according to an embodiment of the present application, and the terminal includes a memory 320, a transceiver 300, and a processor 310.

In FIG. 3, a bus architecture may include any number of interconnected buses and bridges, which are linked together through various circuits of one or more processors represented by processor 310 and one or more memories represented by the memory 320. The bus architecture may also link together various other circuits, such as peripherals, voltage regulators, and power management circuits. The bus interface provides an interface. Transceiver 300 may include multiple elements, i.e., including a transmitter and a receiver, devices for providing communication with various other devices over transmission media including wireless channels, wired channels, fiber optic cables, and the like. The processor 310 is responsible for managing the bus architecture and general processing, and the memory 320 may store data used by the processor 310 when performing operations.

The processor 310 may be a central processing unit (CPU), an application specific integrated circuit (ASIC), a field-programmable gate array (FPGA), or a complex programmable logic device (CPLD), the processor may also use a multi-core architecture.

The memory 320 is used to store a computer program; the transceiver 300 is used to transmit and receive data under a control of the processor; the computer program causes, when executed by the processor 310, the terminal to perform the following operations:

transmitting assistance information to a network side device, where the assistance information includes at least one of the following items: identification information of an optimal reference signal required for uplink transmission, or a power management maximum power reduction (P-MPR) value corresponding to one or more panels of a terminal in case of an occurrence of a maximum permissible exposure (MPE) event; and receiving indication information transmitted by the network side device based on the assistance information, where the indication information is used to indicate a panel used by the terminal for subsequent uplink transmission, or to indicate the terminal to perform uplink beam sweeping.

In an embodiment, in case that the assistance information includes the P-MPR value corresponding to one or more panels of the terminal, the assistance information further includes at least one of:

an MPE event; or a reference signal received power (RSRP) corresponding to one or more panels.

In an embodiment, the transmitting assistance information to the network side device includes:

receiving notification information transmitted by the network side device, and transmitting the assistance information to the network side device based on the notification information, where the notification information is used to notify the terminal to report at least one of identification information of the optimal reference signal required for uplink transmission or the P-MPR value corresponding to one or more panels of the terminal; or in case that the terminal detects the occurrence of the MPE event, transmitting the assistance information to the network side device.

In an embodiment, in case that the terminal detects the occurrence of the MPE event, transmitting the assistance information to the network side device includes:

transmitting request information to the network side device, where the request information is used to trigger the network side device to transmit one or more channel state information reference signals (CSI-RSs) for beam sweeping, the one or more CSI-RSs are pre-associated with the panels of the terminal, and one panel of the terminal is associated with one or more of the CSI-RSs; and measuring each CSI-RS, obtaining a reference signal received power (RSRP) corresponding to a panel associated with the CSI-RS, estimating an uplink transmission power corresponding to the panel based on the RSRP, determining an uplink transmission power of the panel after power reduction based on a power reduction value corresponding to the panel, and determining a reference signal associated with a panel having the highest uplink transmission power after power reduction to be the optimal reference signal required for uplink transmission.

a medium access control layer control element (MAC CE) includes a first preset filed, and the first preset field includes the request information;

the transmitting request information to the network side device includes:

transmitting, by the terminal, the request information to the network side device through the MAC CE.

In an embodiment, a medium access control layer control element (MAC CE) includes a second preset field, and the second preset field is used to indicate the identification information of the optimal reference signal required for uplink transmission;

in case that the terminal detects the occurrence of the MPE event, the transmitting assistance information to the network side device includes:

in case that the terminal detects the occurrence of the MPE event, transmitting, by the terminal, the assistance information to the network side device through the MAC CE, where the assistance information includes the identification information of the optimal reference signal required for uplink transmission and the P-MPR value corresponding to one or more panels of the terminal.

In an embodiment, the notification information is further used to notify the terminal to report an RSRP after power reduction, and the assistance information further includes the RSRP after power reduction.

In an embodiment, before receiving the notification information transmitted by the network side device, the computer program causes, when executed by the processor, the terminal to further perform:

reporting capability information to the network side device, where the capability information is used to indicate that the terminal has a capability of considering a power reduction value in calculating the optimal reference signal.

In an embodiment, before the transmitting the assistance information to the network side device based on the notification information, the computer program causes, when executed by the processor, the terminal to further perform:

performing RSRP measurement on a reference signal configured by the network side device using each panel to obtain an RSRP of the reference signal for each panel; and determining a reference signal having the highest uplink transmission power based on the RSRP of the reference signal for each panel and the P-MPR value corresponding to each panel, and determining the reference signal having the highest uplink transmission power as the optimal reference signal required for uplink transmission.

In an embodiment, the transmitting assistance information to the network side device includes any one of:

transmitting the assistance information to the network side device periodically;

transmitting the assistance information to the network side device semi-persistently; and transmitting the assistance information to the network side device aperiodically.

In an embodiment, the transmitting assistance information to the network side device includes:

transmitting the assistance information to the network side device through a physical random access channel (PRACH), a physical uplink control channel (PUCCH) or a physical uplink shared channel (PUSCH).

In an embodiment, a triggering condition for the MPE event includes:

the P-MPR value is greater than a preset reduction value within a preset period, or an estimated value of an RSRP corresponding to an uplink beam for any panel is smaller than a preset value.

In an embodiment, the uplink transmission includes a physical uplink control channel (PUCCH), a physical uplink shared channel (PUSCH) or a sounding reference signal (SRS).

The above embodiment may perform all the method steps that may be implemented by the above-mentioned terminal-side method embodiments, and may provide the same effect, which is not repeated here.

FIG. 4 is a schematic structural diagram of a network side device according to an embodiment of the present application, and the network side device includes a memory 420, a transceiver 400, and a processor 410.

In FIG. 4, a bus architecture may include any number of interconnected buses and bridges, which are linked together through various circuits of one or more processors represented by processor 410 and one or more memories represented by the memory 420. The bus architecture may also link together various other circuits, such as peripherals, voltage regulators, and power management circuits. The bus interface provides an interface. Transceiver 400 may include multiple elements, i.e., including a transmitter and a receiver, devices for providing communication with various other devices over transmission media including wireless channels, wired channels, fiber optic cables, and the like. The processor 410 is responsible for managing the bus architecture and general processing, and the memory 420 may store data used by the processor 410 when performing operations.

The processor 410 may be a central processing unit (CPU), an application specific integrated circuit (ASIC), a field-programmable gate array (FPGA), or a complex programmable logic device (CPLD), the processor may also use a multi-core architecture.

The memory 420 is used to store a computer program; the transceiver 400 is used to send and receive data under the control of the processor; the computer program causes, when executed by the processor 410, the network side device to perform the following operations:

receiving assistance information transmitted by a terminal, where the assistance information includes at least one of the following items: identification information of an optimal reference signal required for uplink transmission, or a power management maximum power reduction (P-MPR) value corresponding to one or more panels of the terminal in case of an occurrence of a maximum permissible exposure (MPE) event;

determining, based on the assistance information, a panel used by the terminal for subsequent uplink transmission, or the terminal to perform uplink beam sweeping; and transmitting indication information to the terminal, where the indication information is used to indicate the panel used by the terminal for subsequent uplink transmission, or to indicate the terminal to perform uplink beam sweeping.

In an embodiment, in case that the assistance information includes the P-MPR value corresponding to one or more panels of the terminal, the assistance information further includes at least one of:

an MPE event, or a reference signal received power (RSRP) corresponding to one or more panels.

In an embodiment, the receiving assistance information transmitted by a terminal includes:

transmitting notification information to the terminal, and receiving the assistance information transmitted by the terminal based on the notification information, where the notification information is used to notify the terminal to report at least one of the identification information of the optimal reference signal required for uplink transmission or the P-MPR value corresponding to one or more panels of the terminal; or receiving the assistance information transmitted by the terminal in case that the occurrence of the MPE event is detected.

In an embodiment, the receiving the assistance information transmitted by the terminal in case that the occurrence of the MPE event is detected includes:

receiving request information transmitted by the terminal, where the request information is used to trigger the network side device to transmit one or more channel state information reference signals (CSI-RSs) for beam sweeping, the one or more CSI-RSs are pre-associated with panels of the terminal, and one panel of the terminal is associated with one or more of the CSI-RSs; and transmitting, based on the request information, the one or more CSI-RSs for beam sweeping.

In an embodiment, a medium access control layer control element (MAC CE) includes a first preset field, and the first preset field includes the request information;

the receiving request information transmitted by the terminal includes:

receiving request information transmitted by the terminal through the MAC CE.

In an embodiment, a medium access control layer control element (MAC CE) includes a second preset field, and the second preset field is used to indicate the identification information of the optimal reference signal required for uplink transmission;

the receiving the assistance information transmitted by the terminal in case that the occurrence of the MPE event is detected includes:

receiving the assistance information transmitted by the terminal through the MAC CE, where the assistance information includes the identification information of the optimal reference signal required for uplink transmission and the P-MPR value corresponding to one or more panels of the terminal.

In an embodiment, the notification information is further used to notify the terminal to report an RSRP after power reduction, and the assistance information further includes the RSRP after power reduction.

In an embodiment, before the transmitting notification information to the terminal, the computer program causes, when executed by the processor, the network side device to further perform:

receiving capability information transmitted by the terminal, where the capability information is used to indicate that the terminal has a capability of considering a power reduction value in calculating the optimal reference signal.

In an embodiment, the receiving the assistance information transmitted by the terminal includes any one of:

receiving the assistance information periodically transmitted by the terminal;

receiving the assistance information semi-persistently transmitted by the terminal; and receiving the assistance information aperiodically transmitted by the terminal.

In an embodiment, the receiving assistance information transmitted by the terminal includes:

receiving the assistance information transmitted by the terminal through a physical random access channel (PRACH), a physical uplink control channel (PUCCH) or a physical uplink shared channel (PUSCH).

In an embodiment, the determining the panel used by the terminal for subsequent uplink transmission based on the assistance information, includes:

in case that the assistance information includes the identification information of the optimal reference signal required for uplink transmission, determining the panel corresponding to the optimal reference signal required for uplink transmission as the panel used by the terminal for subsequent uplink transmission; or in case that the assistance information includes the P-MPR value corresponding to one or more panels of the terminal, determining a panel having the highest uplink transmission power based on the P-MPR value corresponding to one or more panels of the terminal, and determining the panel having the highest uplink transmission power as the panel used by the terminal for subsequent uplink transmission.

In an embodiment, a triggering condition for the MPE event includes:

the P-MPR value is greater than a preset reduction value within a preset period, or an estimated value of the RSRP corresponding to an uplink beam for any panel is smaller than a preset value.

In an embodiment, the uplink transmission includes a physical uplink control channel (PUCCH), a physical uplink shared channel (PUSCH) or a sounding reference signal (SRS).

The above embodiments may perform all the method steps that may be implemented by the above-mentioned network side device method embodiments, and may provide the same effect, which is not repeated here.

Figure 5:
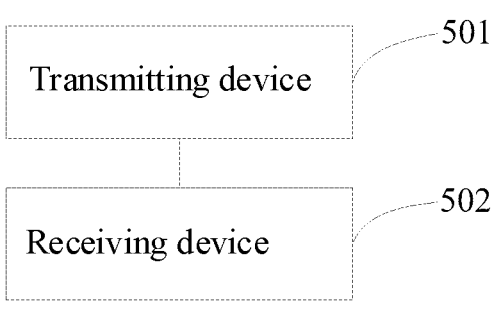
FIG. 5 is a schematic block diagram of an apparatus for panel selection applied to a terminal according to an embodiment of the present application.

FIG. 5 is a schematic block diagram of an apparatus for panel selection applied to a terminal according to an embodiment of the present application. The apparatus includes:

a transmitting device 501, used to transmit assistance information to a network side device, where the assistance information includes at least one of the following items: identification information of an optimal reference signal required for uplink transmission, or a power management maximum power reduction (P-MPR) value corresponding to one or more panels of a terminal in case of an occurrence of a maximum permissible exposure (MPE) event; and a receiving device 502, used to receive indication information transmitted by the network side device based on the assistance information, where the indication information is used to indicate a panel used by the terminal for subsequent uplink transmission, or to indicate the terminal to perform uplink beam sweeping.

In the present embodiment, in case that the assistance information includes the P-MPR value corresponding to one or more panels of the terminal, the assistance information furthers include at least one of: an MPE event or a reference signal received power (RSRP) corresponding to one or more panels.

In an embodiment, the transmitting device 501 includes:

a first transmitting device, used to receive notification information transmitted by the network side device, and transmit the assistance information to the network side device based on the notification information, where the notification information is used to notify the terminal to report at least one of the identification information of the optimal reference signal required for uplink transmission or the P-MPR value corresponding to one or more panels of the terminal; or a second transmitting device, used to in case that the terminal detects the occurrence of the MPE event, transmit the assistance information to the network side device.

In an embodiment, in case that the terminal detects the occurrence of the MPE event, the transmit the assistance information to the network side device includes:

transmit request information to the network side device, where the request information is used to trigger the network side device to transmit one or more channel state information reference signals (CSI-RSs) for beam sweeping, the one or more CSI-RSs are pre-associated with the panels of the terminal, and one panel of the terminal is associated with one or more of the CSI-RSs; and measure each CSI-RS, obtaining a reference signal received power (RSRP) corresponding to a panel associated with the CSI-RS, estimate an uplink transmission power corresponding to the panel based on the RSRP, determine an uplink transmission power of the panel after power reduction based on a power reduction value corresponding to the panel, and determine a reference signal associated with a panel having the highest uplink transmission power after power reduction to be the optimal reference signal required for uplink transmission.

In an embodiment, a medium access control layer control element (MAC CE) includes a first preset filed, and the first preset field includes the request information;

the transmit request information to the network side device includes:

transmit the request information to the network side device through the MAC CE.

In an embodiment, a medium access control layer control element (MAC CE) includes a second preset field, and the second preset field is used to indicate the identification information of the optimal reference signal required for uplink transmission;

in case that the terminal detects the occurrence of the MPE event, transmit assistance information to the network side device includes:

in case that the terminal detects the occurrence of the MPE event, transmit, by the terminal, the assistance information to the network side device through the MAC CE, where the assistance information includes the identification information of the optimal reference signal required for uplink transmission and the P-MPR value corresponding to one or more panels of the terminal.

In an embodiment, the notification information is further used to notify the terminal to report an RSRP after power reduction, and the assistance information further includes the RSRP after power reduction.

In an embodiment, the apparatus further includes:

a reporting device, used to report capability information to the network side device, where the capability information is used to indicate that the terminal has a capability of considering a power reduction value in calculating the optimal reference signal.

In an embodiment, the apparatus further includes:

a determining device, used to perform RSRP measurement on a reference signal configured by the network side device using each panel to obtain RSRP of the reference signal for each panel; and determine a reference signal having the highest uplink transmission power value based on the RSRP of the reference signal for each panel and the P-MPR value corresponding to each panel, and determine the reference signal having the highest uplink transmission power value as the optimal reference signal required for uplink transmission.

In an embodiment, the transmitting device 501 performs any one of the following items:

transmitting the assistance information to the network side device periodically;

transmitting the assistance information to the network side device semi-persistently; and transmitting the assistance information to the network side device aperiodically.

In an embodiment, the transmitting device is used to transmit assistance information to the network side device through a physical random access channel (PRACH), a physical uplink control channel (PUCCH) or a physical uplink shared channel (PUSCH).

In an embodiment, a triggering condition for the MPE event includes that the P-MPR value is greater than a preset reduction value within a preset period, or an estimated value of an RSRP corresponding to an uplink beam for any panel is smaller than a preset value.

In an embodiment, the uplink transmission includes a physical uplink control channel (PUCCH), a physical uplink shared channel (PUSCH) or a sounding reference signal (SRS).

The above embodiment may perform all the method steps that may be implemented by the above-mentioned terminal-side method embodiments, and may provide the same effect, which is not repeated here.

Figure 6:
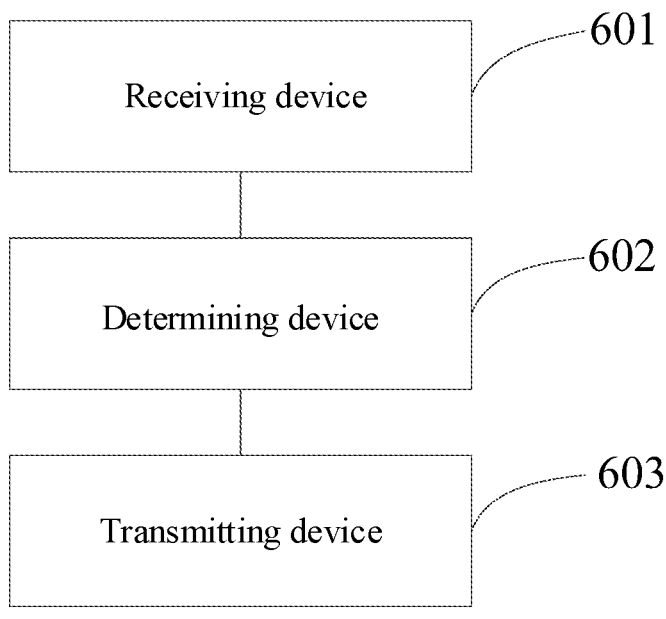
FIG. 6 is a schematic block diagram of an apparatus for panel selection applied to a network side device according to an embodiment of the present application.

FIG. 6 is a schematic block diagram of an apparatus for panel selection applied to a network side device according to an embodiment of the present application. The apparatus includes:

a receiving device 601, used to receive assistance information transmitted by a terminal, where the assistance information includes at least one of the following items: identification information of an optimal reference signal required for uplink transmission, or a power management maximum power reduction (P-MPR) value corresponding to one or more panels of the terminal in case of the occurrence of a maximum permissible exposure (MPE) event;

a determining device 602, used to determine, based on the assistance information, a panel used by the terminal for subsequent uplink transmission or the terminal to perform uplink beam sweeping; and a transmitting device 603, used to transmit indication information to the terminal, where the indication information is used to indicate the panel used by the terminal for subsequent uplink transmission, or to indicate the terminal to perform uplink beam sweeping.

In an embodiment, in case that the assistance information includes the P-MPR value corresponding to one or more panels of the terminal, the assistance information further includes an MPE event and/or a reference signal received power (RSRP) corresponding to one or more panels.

In an embodiment, the receiving device 601 includes:

a first receiving device, used to transmit notification information to the terminal, and receive the assistance information transmitted by the terminal based on the notification information, where the notification information is used to notify the terminal to report at least one of the identification information of the optimal reference signal required for uplink transmission or the P-MPR value corresponding to one or more panels of the terminal; or a second receiving device, used to receive the assistance information transmitted by the terminal in case that occurrence of the MPE event is detected.

In an embodiment, the receive the assistance information transmitted by the terminal in case that occurrence of the MPE event is detected includes:

receive request information transmitted by the terminal, where the request information is used to trigger the network side device to transmit one or more channel state information reference signals (CSI-RSs) for beam sweeping, the one or more CSI-RSs are pre-associated with panels of the terminal, and one panel of the terminal is associated with one or more of the CSI-RSs; and transmit, based on the request information, the one or more CSI-RSs for beam sweeping.

In an embodiment, a medium access control layer control element (MAC CE) includes a first preset filed, and the first preset field includes the request information;

the receive request information transmitted by the terminal includes:

receive request information transmitted by the terminal through the MAC CE.

In an embodiment, a medium access control layer control element (MAC CE) includes a second preset field, and the second preset field is used to indicate the identification information of the optimal reference signal required for uplink transmission;

the receive the assistance information transmitted by the terminal in case that occurrence of the MPE event is detected includes:

receive the assistance information transmitted by the terminal through the MAC CE, where the assistance information includes identification information of an optimal reference signal required for uplink transmission and the P-MPR value corresponding to one or more panels of the terminal.

In an embodiment, the notification information is further used to notify the terminal to report an RSRP after power reduction, and the assistance information further includes the RSRP after power reduction.

In an embodiment, the apparatus further includes:

a third receiving device, used to before the transmit notification information to the terminal, receive capability information transmitted by the terminal, where the capability information is used to indicate that the terminal has a capability of considering a power reduction value in calculating the optimal reference signal.

In an embodiment, the receiving device performs any one of the followings:

receiving the assistance information periodically transmitted by the terminal;

receiving the assistance information semi-persistently transmitted by the terminal; and receiving the assistance information aperiodically transmitted by the terminal.

In an embodiment, the receiving device is used to receive the assistance information transmitted by the terminal through a physical random access channel (PRACH), a physical uplink control channel (PUCCH) or a physical uplink shared channel (PUSCH).

In an embodiment, the determining device is used to:

in case that the assistance information includes the identification information of the optimal reference signal required for uplink transmission, determine the panel corresponding to the optimal reference signal required for uplink transmission as the panel used by the terminal for subsequent uplink transmission; or in case that the assistance information includes the P-MPR value corresponding to one or more panels of the terminal, determine a panel or beam having the highest uplink transmission power value based on the P-MPR value corresponding to one or more panels of the terminal, and determine the panel having the highest uplink transmission power value as the panel used by the terminal for subsequent uplink transmission.

In an embodiment, a triggering condition for the MPE event includes that the P-MPR value is greater than a preset reduction value within a preset period, or an estimated value of the RSRP corresponding to an uplink beam for any panel is smaller than a preset value.

In an embodiment, the uplink transmission includes a physical uplink control channel (PUCCH), a physical uplink shared channel (PUSCH) or a sounding reference signal (SRS).

The above embodiments may perform all the method steps that may be implemented by the above-mentioned network side device method embodiments, and may provide the same effect, which is not repeated here.

It should be noted that, the division of devices in the embodiments of the present application is schematic, and is only a logical function division, and there may be other division manners in actual implementation. In addition, the functional devices in the various embodiments of the present application may be integrated into one processing device, or each device may exist alone physically, or two or more devices may be integrated into one device. The above-mentioned integrated device may be implemented in the form of hardware or software functional device.

If the integrated device is implemented in the form of a software functional device and sold or used as an independent product, it may be stored in a computer readable storage medium. Based on such understanding, the solutions of the present application in essence or a part of the solutions that contributes to the prior art, or all or part of the solutions, may be embodied in the form of a software product, which is stored in a storage medium, including several instructions to cause a computer device (which may be a personal computer, server, or network side device, etc.) or a processor to perform all or part of the steps of the methods described in the respective embodiments of the present application. The storage medium described above includes various media that may store program codes such as U disk, mobile hard disk, read-only memory (ROM), random access memory (RAM), magnetic disk, or a compact disk.

It should be noted here that the above-mentioned apparatus according to the embodiments of the present application may implement all the method steps implemented by the above-mentioned method embodiments, and may achieve the same effect. The same parts and beneficial effects as the same method embodiments are not repeated here.

An embodiment of the present application provides a non-transitory computer readable storage medium having stored thereon a computer program that, when executed by a processor, cause the processor to perform the steps of the methods described above.

The computer readable storage medium may be any available medium or data storage device that may be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

From the foregoing embodiments that a computer-readable storage medium stores a computer program, and the computer program is used to cause the processor to perform the methods described in the foregoing embodiments.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof may be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These computer-executable instructions may also be stored in a computer-readable memory capable of directing a computer or other programmable data processing apparatus to operate in a particular manner, and the instructions stored in the computer-readable memory may result in a manufacture including instruction means, the instruction means may perform the functions specified in one or more flows of the flowchart and/or one or more blocks of the block diagram.

These computer-executable instructions may also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A method for panel selection, comprising:
transmitting assistance information to a network side device, wherein the assistance information comprises at least one of the following items: identification information of an optimal reference signal required for uplink transmission, or a power management maximum power reduction (P-MPR) value corresponding to one or more panels of a terminal in case of an occurrence of a maximum permissible exposure (MPE) event, wherein the optimal reference signal required for uplink transmission is a reference signal with the highest uplink transmission power value; and
receiving indication information transmitted, based on the assistance information, by the network side device, wherein the indication information is used to indicate a panel or beam used by the terminal for subsequent uplink transmission, or to indicate the terminal to perform uplink beam sweeping;
wherein the transmitting assistance information to the network side device comprises: receiving notification information transmitted by the network side device, and transmitting the assistance information to the network side device based on the notification information; or, transmitting the assistance information to the network side device in case that the terminal detects the occurrence of the MPE event,
wherein in case that the terminal detects the occurrence of the MPE event, transmitting the assistance information to the network side device comprises:
transmitting request information to the network side device, wherein the request information is used to trigger the network side device to transmit one or more channel state information reference signals, CSI-RSs, for beam sweeping, the one or more CSI-RSs are pre-associated with the panels of the terminal, and one panel of the terminal is associated with one or more of the CSI-RSs; and
measuring each CSI-RS, obtaining a reference signal received power, RSRP, corresponding to a panel associated with the CSI-RS, estimating an uplink transmission power corresponding to the panel based on the RSRP, determining an uplink transmission power of the panel after power reduction based on a power reduction value corresponding to the panel, and determining a reference signal associated with a panel having the highest uplink transmission power after power reduction to be the optimal reference signal required for uplink transmission.

2. The method of claim 1, wherein in case that the assistance information comprises the P-MPR value corresponding to one or more panels of the terminal, the assistance information further comprises at least one of:
an MPE event; or
a reference signal received power (RSRP) corresponding to one or more panels.

3. The method of claim 1, wherein
the notification information is used to notify the terminal to report at least one of the identification information of the optimal reference signal required for uplink transmission or the P-MPR value corresponding to one or more panels of the terminal.

4. The method of claim 1, wherein a medium access control layer control element (MAC CE) comprises a first preset field, and the first preset field comprises the request information;
the transmitting request information to the network side device comprises:
transmitting, by the terminal, the request information to the network side device through the MAC CE.

5. The method of claim 1, wherein a medium access control layer control element (MAC CE) comprises a second preset field, and the second preset field is used to indicate the identification information of the optimal reference signal required for uplink transmission;
in case that the terminal detects the occurrence of the MPE event, the transmitting assistance information to the network side device comprises:
in case that the terminal detects the occurrence of the MPE event, transmitting, by the terminal, the assistance information to the network side device through the MAC CE,
wherein the assistance information comprises the identification information of the optimal reference signal required for uplink transmission and the P-MPR value corresponding to one or more panels of the terminal.

6. The method of claim 3, wherein the notification information is further used to notify the terminal to report an RSRP after power reduction, and the assistance information further comprises the RSRP after power reduction.

7. The method of claim 3, wherein before the receiving notification information transmitted by the network side device, the method further comprises:
reporting capability information to the network side device, wherein the capability information is used to indicate that the terminal has a capability of considering a power reduction value in calculating the optimal reference signal.

8. The method of claim 3, wherein before the transmitting the assistance information to the network side device based on the notification information, the method further comprises:

performing RSRP measurement on a reference signal configured by the network side device using each panel to obtain an RSRP of the reference signal for each panel; and determining a reference signal having the highest uplink transmission power based on the RSRP of the reference signal for each panel and the P-MPR value corresponding to each panel, and determining the reference signal having the highest uplink transmission power as the optimal reference signal required for uplink transmission.

9. A method for panel selection, comprising:

receiving assistance information transmitted by a terminal, wherein the assistance information comprises at least one of the following items: identification information of an optimal reference signal required for uplink transmission, or a power management maximum power reduction (P-MPR) value corresponding to one or more panels of the terminal in case of an occurrence of a maximum permissible exposure (MPE) event, wherein the optimal reference signal required for uplink transmission is a reference signal with the highest uplink transmission power value;

determining, based on the assistance information, a panel or beam used by the terminal for subsequent uplink transmission, or the terminal to perform uplink beam sweeping; and transmitting indication information to the terminal, wherein the indication information is used to indicate the panel or beam used by the terminal for subsequent uplink transmission, or to indicate the terminal to perform uplink beam sweeping;

wherein the receiving assistance information transmitted by the terminal comprises: transmitting notification information to the terminal, and receiving the assistance information transmitted by the terminal based on the notification information; or, receiving the assistance information transmitted by the terminal in case that the occurrence of the MPE event is detected;

wherein the receiving the assistance information transmitted by the terminal in case that the occurrence of the MPE event is detected comprises:

receiving request information transmitted by the terminal, wherein the request information is used to trigger the network side device to transmit one or more channel state information reference signals (CSI-RSs) for beam sweeping, the one or more CSI-RSs are pre-associated with panels of the terminal, and one panel of the terminal is associated with one or more of the CSI-RSs; and transmitting, based on the request information, the one or more CSI-RSs for beam sweeping.

10. The method of claim 9, wherein in case that the assistance information comprises the P-MPR value corresponding to one or more panels of the terminal, the assistance information further comprises at least one of:

an MPE event; or a reference signal received power (RSRP) corresponding to one or more panels.

11. The method of claim 9, wherein the notification information is used to notify the terminal to report at least one of the identification information of the optimal reference signal required for uplink transmission or the P-MPR value corresponding to one or more panels of the terminal.

12. The method of claim 9, wherein a medium access control layer control element (MAC CE) comprises a first preset field, and the first preset field comprises the request information;

the receiving request information transmitted by the terminal comprises:

receiving request information transmitted by the terminal through the MAC CE.

13. The method of claim 9, wherein a medium access control layer control element (MAC CE) comprises a second preset field, and the second preset field is used to indicate the identification information of the optimal reference signal required for uplink transmission;

the receiving the assistance information transmitted by the terminal in case that the occurrence of the MPE event is detected comprises:

receiving the assistance information transmitted by the terminal through the MAC CE, wherein the assistance information comprises the identification information of the optimal reference signal required for uplink transmission and the P-MPR value corresponding to one or more panels of the terminal.

14. The method of claim 11, wherein the notification information is further used to notify the terminal to report an RSRP after power reduction, and the assistance information further comprises the RSRP after power reduction.

15. The method of claim 11, wherein before the transmitting notification information to the terminal, the method further comprises:

receiving capability information transmitted by the terminal, wherein the capability information is used to indicate that the terminal has a capability of considering a power reduction value in calculating the optimal reference signal.

16. The method of claim 9, wherein the determining the panel or beam used by the terminal for subsequent uplink transmission based on the assistance information, comprises:

in case that the assistance information comprises the identification information of the optimal reference signal required for uplink transmission, determining the panel or beam corresponding to the optimal reference signal required for uplink transmission as the panel or beam used by the terminal for subsequent uplink transmission; or in case that the assistance information comprises the P-MPR value corresponding to one or more panels of the terminal, determining a panel or beam having the highest uplink transmission power based on the P-MPR value corresponding to one or more panels of the terminal, and determining the panel or beam having the highest uplink transmission power as the panel or beam used by the terminal for subsequent uplink transmission.

17. A terminal, comprising:

a processor;

a memory storing a computer program;

a transceiver for transmitting and receiving data under a control of the processor, wherein the computer program, when executed by the processor, causes the terminal to perform the following operations of:

transmitting assistance information to a network side device, wherein the assistance information comprises at least one of the following items: identification information of an optimal reference signal required for uplink transmission, or a power management maximum power reduction (P-MPR) value corresponding to one or more panels of a terminal in case of an occurrence of a maximum permissible exposure (MPE) event, wherein the optimal reference signal required for uplink transmission is a reference signal with the highest uplink transmission power value; and receiving indication information transmitted, based on the assistance information, by the network side device, wherein the indication information is used to indicate a panel or beam used by the terminal for subsequent uplink transmission, or to indicate the terminal to perform uplink beam sweeping;

wherein the transmitting assistance information to the network side device comprises: receiving notification information transmitted by the network side device, and transmitting the assistance information to the network side device based on the notification information; or, transmitting the assistance information to the network side device in case that the terminal detects the occurrence of the MPE event, wherein in case that the terminal detects the occurrence of the MPE event, transmitting the assistance information to the network side device comprises:

transmitting request information to the network side device, wherein the request information is used to trigger the network side device to transmit one or more channel state information reference signals, CSI-RSs, for beam sweeping, the one or more CSI-RSs are pre-associated with the panels of the terminal, and one panel of the terminal is associated with one or more of the CSI-RSs; and measuring each CSI-RS, obtaining a reference signal received power, RSRP, corresponding to a panel associated with the CSI-RS, estimating an uplink transmission power corresponding to the panel based on the RSRP, determining an uplink transmission power of the panel after power reduction based on a power reduction value corresponding to the panel, and determining a reference signal associated with a panel having the highest uplink transmission power after power reduction to be the optimal reference signal required for uplink transmission.

18. A network side device, comprising:

a processor;

a memory storing a computer program;

a transceiver for transmitting and receiving data under a control of the processor, wherein the computer program, when executed by the processor, causes the network side device to perform the method of claim 9.

\* \* \* \* \*